Patented Feb. 1, 1938

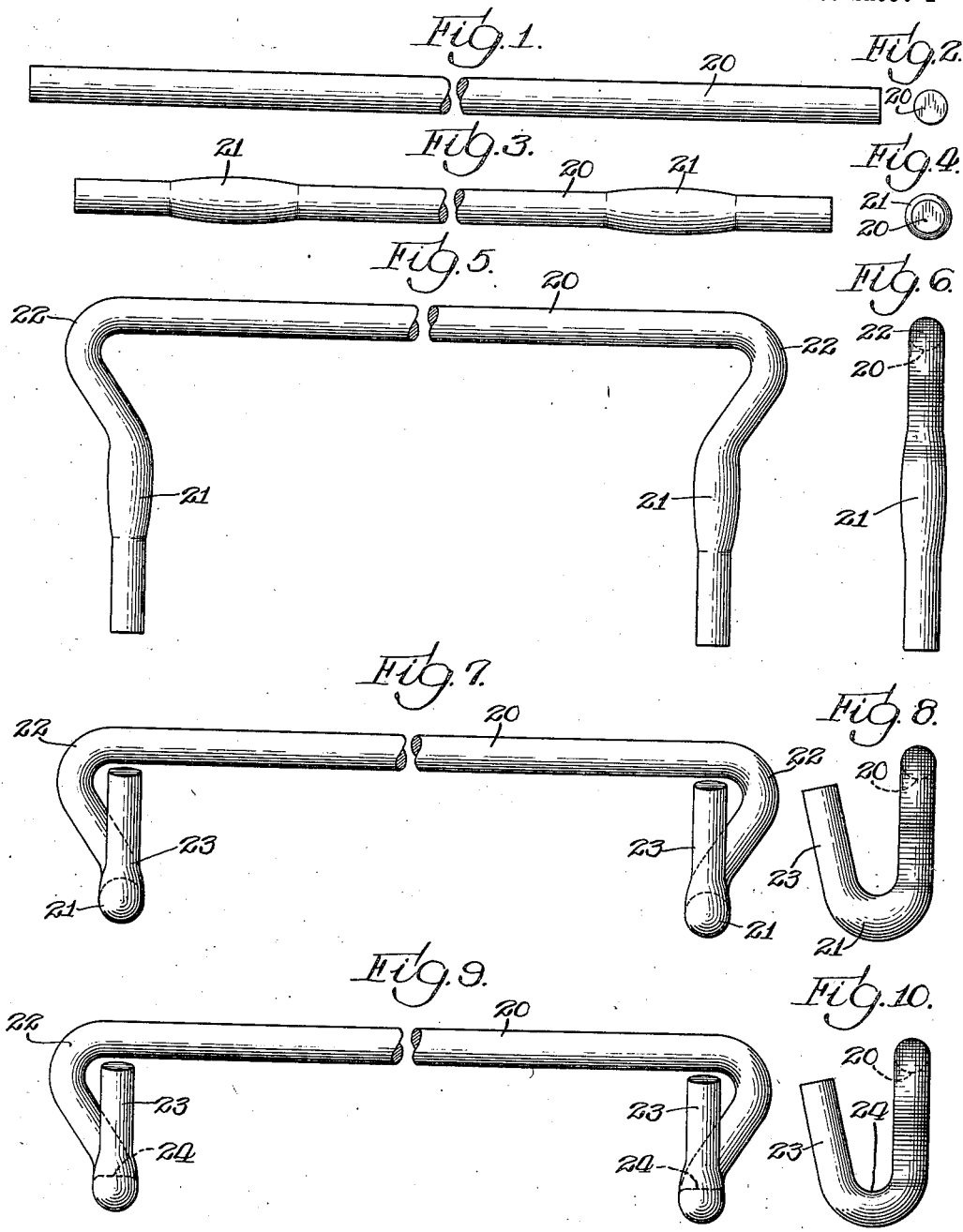

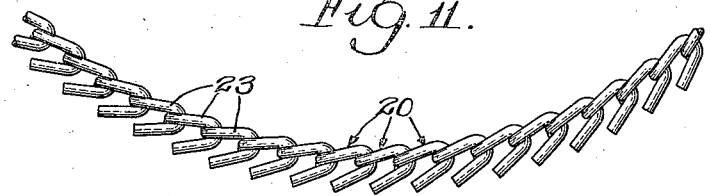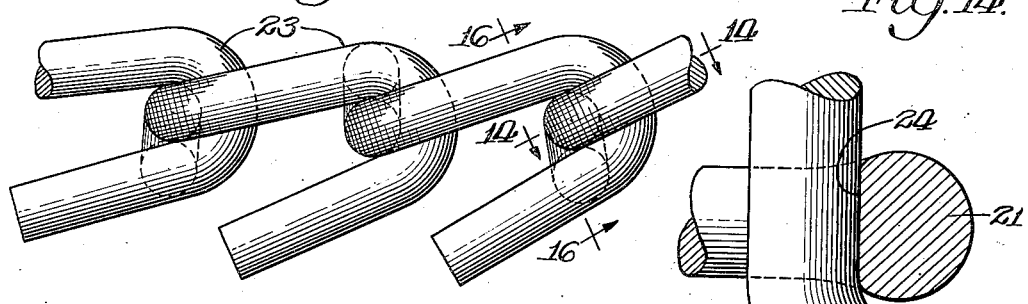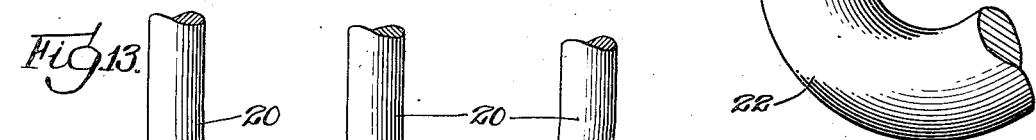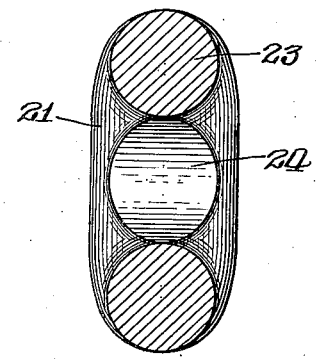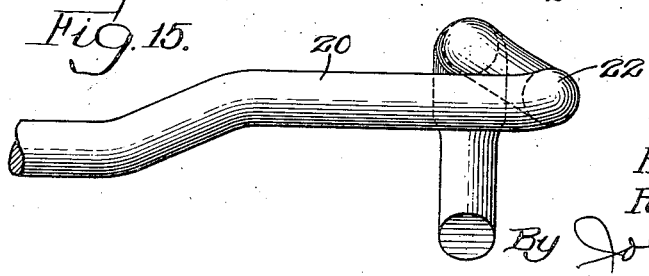

2,107,021

UNITED STATES PATENT OFFICE 2,107,021

POTATO DIGGER CHAIN

Herman E. Altgelt and Rudolph J. Altgelt, South Bend, Ind., assignors to Oliver Farm Equipment Company, a corporation of Delaware Application February 18, 1935, Serial No. 6,970

5 Claims. (Cl. 198—195)

The present invention relates generally to potato diggers, but more particularly to the elevator chain link and method of making the same.

It has been the practice heretofore in the construction and manufacture of chain links for potato elevators to form the links of round steel stock containing certain predetermined carbon content so that the round portion of each link forms the contacting or pivotal connection with an adjacent link. This arrangement obviously causes the peripheral surface of one link to pivotally engage the peripheral surface of the adjacent link so that after a short time the links at these points become quickly worn down with a result that the links enlarge their pitch causing the chain to climb on the drive sprocket wheel. This adversely affects the efficient operation of the machine and in many instances breaks the chain, requiring a replacement of a complete elevator chain.

It is therefore, the primary object of the present invention to overcome these objections and to provide a novel and improved construction of a potato digger elevating chain link whereby the wearing surface, which operatively connects the adjacent links to one another is increased to a maximum, thereby increasing the life of the chain and reducing the cost of replacement.

A further object of the invention is to provide a novel and improved method of making chain links for potato digger elevator.

A still further object of the invention is to provide a novel and improved elevator chain link in which the bearing surface between the respective links is increased to a maximum so as to maintain the pitch therebetween and prevent the climbing of the chain on the sprocket drive wheel.

These and other objects are accomplished by providing a construction and an arrangement of the various parts in the manner hereinafter described and particularly pointed out in the appended claims.

Referring to the drawings:

Fig. 1 is a fragmentary top plan view of a blank severed from round steel stock showing the first step in the operation or method employed in making our improved chain links;

Fig. 2 is an end elevational view of the same;

Fig. 3 is a top plan view of the second step in the method of making our chain links showing two portions of the blank upset adjacent its ends;

Fig. 4 is an end elevational view of the construction shown in Fig. 3;

Fig. 5 is a top plan view showing the third step in our improved method of making chain links in which the outer bends are formed;

Fig. 6 is an end elevational view of the construction shown in Fig. 5;

Fig. 7 is a top plan view showing the fourth step in our improved method of making the chain links forming the transverse hooks;

Fig. 8 is an end elevational view of the construction shown in Fig. 7;

Fig. 9 is a top plan view of the chain link in its final operation in which the upset portion is flattened in the transverse hook so as to increase the wearing surface thereof;

Fig. 10 is a side elevational view of the construction shown in Fig. 9;

Fig. 11 is a side elevational view of a series of potato elevator links connected together;

Fig. 12 is an enlarged side elevational view of a plurality of links connected together;

Fig. 13 is an enlarged fragmentary top plan view of the links shown in Fig. 12;

Fig. 14 is an enlarged fragmentary cross sectional view taken on the line 14—14 in Fig. 12;

Fig. 15 is a fragmentary side elevational view of one of the links; and

Fig. 16 is an enlarged cross sectional view taken on the line 16—16 in Fig. 12.

In potato digger elevator chains that have been used heretofore, the links are made of round stock material and the adjacent links are pivotally connected together so that the round surface or peripheral surface of these adjacent links are pivotally contacting at substantially one point or the equivalent of two tangent circles. Obviously, this arrangement does not provide a substantial bearing surface between the adjacent links and in a short time, become badly worn with the result that the pitch of the chain is changed so that the same does not fit the driving sprocket wheels of the potato digger requiring in most instances, the replacement of the entire chain. In order to overcome this difficulty, we have provided a newly constructed chain link with increased wearing surface at this point which more than triples the life of the chain so that it retains its pitch and reduces the wear at this point and also reduces replacement to a minimum without materially increasing the weight of the links or adding to the cost thereof.

The first step in our improved process of manufacturing this improved link comprises the severance of the stock into suitable lengths or blanks 20 illustrated in Fig. 1 of the drawings, then suitably upsetting these blanks adjacent their ends as shown at 21 in Figs. 3 and 4 of the drawings. The next step in the method consists of forming the rounded horizontal bends or semi-loops as shown in Fig. 5 of the drawings, with the ends thereof bent at substantially right angles to the intermediate portion of the blank, then bending the ends to form the transverse hook with the upset portion 21 forming substantially a semi-circular portion of the transverse hook as shown in Fig. 7 of the drawings. The final step in the operation is to flatten the upset portion so as to form a semi-cylindrical bearing surface whose axis is parallel to the axis of the intermediate portion of the links as clearly shown in Figs. 9, 14 and 16 of the drawings. In other words, this depressed curved surface 24 formed in the upset portion 21 of the transverse hook 23 is the concentric surface adapted to engage the concentric curved surface of the adjacent link so as to increase the bearing surface thereof in the manner clearly indicated in Figs. 13 and 14 of the drawings. Obviously, this arrangement not only increases the life of the chain manifold, but also retains a more accurate pitch in the chain and renders the operation of the potato digger elevator chain more efficient in that the chain is prevented from climbing on the driving sprocket wheels.

While in the above specification we have described one embodiment which our invention may assume in practice, and one method of manufacture thereof, it will of course be understood that the same is capable of certain modifications without departing from the spirit and scope of the invention as defined by the following claims.

What we claim as our invention and desire to secure by Letters Patent is:

1. An elevator chain link comprising a rod having sprocket wheel engaging portions and adjacent link engaging hooks, the bearing portions of said hooks having upset cross section and depressed cylindrical surfaces for increasing the wearing surface and strength thereof.

2. An elevator chain link comprising a rod having an elongated main body portion, bent semi-loop portions formed adjacent the outer ends of said link, transverse hook portions formed integrally with said semi-loop portions and located in planes at right angles to the axis of said main body portion, and enlarged upset cylindrical bearing surfaces formed in said last named hooks whose axis is parallel to the axis of the main body portion of said link.

3. An elevator chain link comprising a round rod having a substantially elongated main body portion, the intermediate end portions of said rod curved inwardly to form outwardly projecting semi-loops, and transverse hook portions formed adjacent said semi-loops, said last named hook portions having upset portions with semi-cylindrical bearing surfaces whose axis is parallel with the axis of said main body portion.

4. An elevator chain link comprising a round rod having a substantially elongated main body portion, the intermediate end portions of said rod curved inwardly to form outwardly projecting semi-loops, and transverse hook portions formed adjacent said semi-loops, the hook portions being upset and having their inner curved surfaces depressed whereby the bearing surfaces thereof are increased.

5. A potato digger elevator chain link made from a rod of steel of round cross section, and comprising an elongated main body portion, the intermediate end portions bent inwardly to form substantially semi-circular loops, hook portions formed as a continuation of said loops and positioned in planes at right angles to the main body portion, the connecting portions of said hooks upset and provided with cylindrical-like surfaces for increasing the bearing surfaces of said link.

HERMAN E. ALTGELT.
RUDOLPH J. ALTGELT.